United States Patent

Hohmann et al.

[11] B 4,000,167
[45] Dec. 28, 1976

[54] NITROANTHRAQUINONES

[75] Inventors: Walter Hohmann, Leverkusen; Helmut Herzog, Bergisch-Neukirchen; Hans-Samuel Bien, Burscheid, all of Germany

[73] Assignee: Bayer Aktiengesellschaft, Leverkusen, Germany

[22] Filed: Jan. 8, 1974

[21] Appl. No.: 431,713

[44] Published under the second Trial Voluntary Protest Program on February 10, 1976 as document No. B 431,713.

[30] Foreign Application Priority Data

Jan. 8, 1973 Germany .......................... 2300592

[52] U.S. Cl. ................................ 260/378; 8/39 C; 8/40; 8/179
[51] Int. Cl.² .......................................... C09B 1/16
[58] Field of Search .................................. 260/378

[56] References Cited

UNITED STATES PATENTS

| | | | |
|---|---|---|---|
| 1,828,588 | 10/1931 | Bally et al. | 260/378 |
| 2,273,966 | 2/1942 | Klein | 260/378 |
| 2,727,045 | 12/1955 | McSheehy | 260/378 |
| 2,759,940 | 8/1956 | Bucheler et al. | 260/378 X |
| 3,123,605 | 3/1964 | Turetzky et al. | 260/378 X |
| 3,491,126 | 1/1970 | Schwander et al. | 260/378 X |
| R27,413 | 6/1972 | Schwander et al. | 260/378 X |

*Primary Examiner*—Paul T. Shaver
*Attorney, Agent, or Firm*—Plumley and Tyner

[57] ABSTRACT

Compounds of the formula

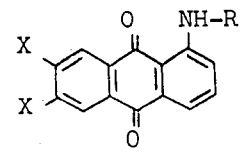

in which R represents an alkyl, alkenyl, cycloalkyl or aralkyl radical, one X represents a nitro group and the other X represents hydrogen and their mixtures. They are very suitable for the dyeing of synthetic fibres, such as fibres of polyesters.

5 Claims, No Drawings

NITROANTHRAQUINONES

The invention relates to compounds of the formula

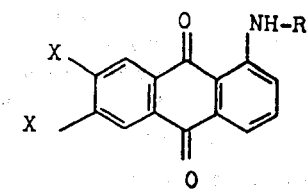

(I)

in which
R represents an alkyl, alkenyl, cycloalkyl or aralkyl radical,
one X represents a nitro group and
the other X represents hydrogen, their preparation and their use for dyeing and printing synthetic fibres.

The invention also relates to mixtures of compounds of the formula I.

Suitable alkyl and alkenyl radicals are those with 1 – C atoms such as methyl, ethyl, n- or iso-propyl, allyl, n-, iso- and tert.-butyl, hexyl or dodecyl radicals which can optionally contain further substituents, for example nitrile, hydroxyl, nitro, halogen, amino, alkoxy, alkoxycarbonyl, alkoxycarbonyloxy, alkylcarbonyloxy, acylamino, especially alkylcarbonylamino, alkylsulphonyl, arylsulphonyl, alkylaminocarbonyloxy, alkylmercapto, monoalkylamino and dialkylamino, aryloxy, arylcarbonyloxy and alkylaminosulphonyloxy. The alkyl and alkoxy groups preferably have 1 – 4 C atoms; the aryl groups are preferably phenyl radicals optionally substituted by halogen, $C_1$–$C_4$-alkyl or $C_1$–$C_4$-alkoxy.

Examples of such alkyl radicals are β-chloroethyl, β,β,β-trifluoroethyl, β,γ-dichloropropyl, β-cyanoethyl, β-cyanoethoxy-ethyl, β-methoxyethyl, δ-methoxybutyl, glycidyl, β-hydroxyethyl, β,γ-dihydroxypropyl, β-nitroethyl, β-methoxycarbonylethyl, β-propoxycarbonylethyl, β-cyanoalkoxycarbonyl-ethyl, β-methoxycarbonylpropyl, β-acetylaminoethyl, β-acetoxy-ethyl, β-propoxyethyl, β,γ-diacetoxypropyl, β-acetylaminopropyl, β-methylsulphonylethyl, β-ethylsulphonylethyl, γ-chlorophenylsulphonylpropyl, β-methylaminocarbonylaminoethyl, β-methoxycarbonyloxyethyl, β-methylaminothiocarbonylaminoethyl, β-methylaminosulphonyloxyethyl, γ-phenylaminosulphonyloxypropyl, β-nitrophenoxyethyl, β-hydroxyphenoxyethyl, β-cyanoethoxy-carbonylethyl, β-carboxyethyl, β-acetylaminoethyl, γ-amino-propyl, β-diethylaminoethyl, β-benzoyloxyethyl and β-ethyl-sulphonylethyl.

Suitable araliphatic radicals are especially phenyl-$C_1$-$_8$-alkyl radicals optionally substituted further by halogen (especially Cl, F and Br), $C_1$–$C_4$-alkyl, cyclohexyl and $C_1$–$C_4$-alkoxy, for example phenylmethyl, β-phenylethyl, γ-phenyl-propyl, β-phenyl-α-methylethyl, γ-phenyl-α,γ,γ-trimethylpropyl, α-[β-phenyl-ethyl]γ-methyl-butyl, α-isopropyl-γ-phenyl-propyl and α-cyclohexyl-γ-phenylpropyl.

Suitable cycloaliphatic radicals are cyclohexyl, cyclohexyl substituted by $C_{1-8}$-alkyl, benzyl-cyclohexyl optionally substituted in the phenyl radical by Cl or $C_1$–$C_4$-alkyl, such as [o- or p-benzyl]-cyclohexyl and 2-benzyl-3,3,4-trimethyl-cyclohexyl, p-bis-cyclohexyl, p-benzylaminocyclo-hexyl, endo-methylene-cyclohexyl, phenylcyclohexyl, phenoxy-cyclohexyl, hydroxy-cyclohexyl, $C_{1-4}$-alkoxycyclohexyl, amino-cyclohexyl, $C_1$–$C_4$-alkylamino-cyclohexyl, acylaminocyclohexyl, especially $C_2$–$C_5$-alkylcarbonylaminocyclohexyl, and halogenocyclohexyl such as chlorocyclohexyl or bromocyclohexyl.

Preferred dyestuffs are those of the formula

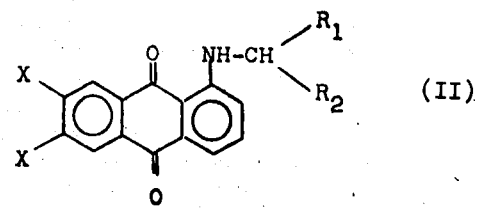

(II)

and their mixtures
wherein
$R_1$ and $R_2$ independently of one another denote alkyl with – 4 C atoms, which can be substituted by hydroxyl, CN, halogen, such as chlorine and bromine, amino, alkoxy with 1 – 4 C atoms, alkylcarbonyloxy and alkylcarbonylamino with 2 – 5 C atoms each, or together with the methine group form a cyclohexyl radical which can be substituted by alkyl groups with 1 – 4 C atoms, cyclohexyl, phenyl, phenoxy, benzyl, benzylamino or alkylcarbonyloxy and alkyl-carbonylamino with 2 – 5 C atoms each.

Compounds of the formula I can be obtained in good yield from compounds of the formula III

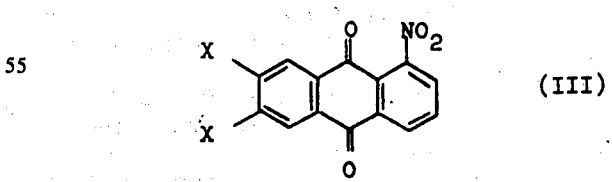

(III)

in which
one X represents a nitro group and
the other X represents hydrogen by treatment with amines of the formula IV

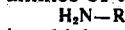 (IV)

in which

R has the abovementioned meaning in the presence of organic solvents.

Suitable solvents can be hydrophobic or hydrophilic in nature.

As hydrophobic solvents there may be mentioned halogenated or nitrated hydrocarbons of the aliphatic or aromatic series, for example $\alpha,\beta$-dichloroethane, $\alpha,\alpha,\beta,\beta$-tetrachloroethane, chlorobenzene, o-dichlorobenzene, trichlorobenzenes, $\alpha$-chloronaphthalene or preferably nitrobenzene. As hydrophilic solvents there may be mentioned tertiary bases of aliphatic or aromatic nature, such as, for example, triethanolamine, pyridine, methylpyridines, cyclic ethers such as dioxane, alkylformamides such as dimethylformamide, alkylsulphoxides such as dimethylsulphoxide and cyclic sulphones such as sulpholane.

Finally, it is also advantageously possible to employ, as solvents, excess amines of the formula IV, preferably those which are liquid at the reaction temperature. Acid-binding agents such as salts of weak inorganic or organic acids, for example the sodium, potassium and magnesium salts of carbonic acid or acetic acid, or tertiary organic bases, for example triethanolamine or pyridine, or inorganic bases, such as magnesium oxide, can be added to neutralise the nitrous acid initially split off during the reaction. The reaction temperatures depend on the nature of the amine to be reacted and on the concentration of the reactants. The reactions can be carried out at 50° – 200°C but preferably at 80° – 150°C.

The reaction times depend on the nature of the amine to be reacted, on the selected reaction temperature and on the concentration of the reactants. By suitably choosing these variables it almost always proves possible to complete the reactions in at most 10 hours.

Under the reaction conditions mentioned, only the nitro groups in the $\alpha$-position react.

The reaction products can be isolated in a manner which is in itself known, by dilution with low molecular alcohols or by evaporating the reaction melt or, if excess amine was used as the solvent, by dilution with optionally aqueous mineral acids or organic acids.

It is possible to employ either pure 1,6-dinitroanthraquinone and 1,7-dinitroanthraquinone — obtainable, for example, according to Helv. Chim. acta 14, 1404, or Z. vses. chim. Obsc. 11 (1966) No. 1, pages 35 – 43 — or, particularly advantageously, a mixture of both components. Such mixtures can readily be isolated from the mother liquors of the dinitration of anthraquinone in oleum, after having removed 1,5- and 1,8-dinitroanthraquinone, by dilution of the mother liquors with water.

Compounds of the formula I are very suitable for dyeing and printing synthetic fibres, such as fibres of cellulose esters, polyamides and above all polyesters.

The most diverse dyeing and printing processes can be used, for example the exhaustion process using carriers, the high temperature process, the thermosol process or the transfer printing process.

Brilliant dyeings and prints with good to very good fastness properties are obtained.

In addition, compounds of the formula I are also valuable intermediate products for the manufacture of dyestuffs obtainable, for example, by reaction at the nitro group or by halogenation.

EXAMPLE 1

35 ml of isopropylamine are added over the course of 3 hours to 50 g of 1,7-dinitroanthraquinone (93% strength) in 150 ml of nitrobenzene at 95° – 100°C and the mixture is stirred for a further 30 minutes at the same temperature. Chromatographically, no further starting material is detectable at that stage. The mixture is stirred until cold and the product is filtered off, washed with methanol and water, and dried. 40.6 g of practically pure 1-isopropylamino-7-nitroanthraquinone, representing 84% of theory, are obtained.

EXAMPLE 2

15 g of 94% strength 1,6-dinitroanthraquinone in 45 ml of cyclohexylamine are stirred for 1 hour at 60° and 2 hours at 70° – 75°C. At that stage, no further starting material is detectable. The mixture is diluted with 45 ml of ethylene glycol monomethyl ether and the product is filtered off at 65°C, washed with ethylene glycol monomethyl ether and water and dried. 15.1 g of 1-cyclohexylamino-6-nitroanthraquinone, representing 91.5% of theory, are obtained.

EXAMPLE 3

40 g of 93% strength 1,7-dinitroanthraquinone are dissolved in 120 ml of nitrobenzene and methylamine is passed into this solution at 95° – 100°C until no further starting material is detectable in a sample which is withdrawn and chromatographed (approx. 3 hours are required). The mixture is allowed to cool and the needles which have separated out are filtered off and washed with a little nitrobenzene and finally with methanol until free of nitrobenzene. 32.8 g of 1-methylamino-7-nitroanthraquinone, representing 93% of theory, are obtained.

EXAMPLE 4 a. 50 ml of ethanolamine are added to 100 g of a technical mixture of 1,6- and 1,7-dinitroanthraquinone in 300 ml of dimethylformamide at 95° – 100°C over the course of 15 minutes and the mixture is stirred for a further 15 minutes at the same temperature. When the temperature has fallen to 70°C the mixture is diluted with 300 ml of methanol, the whole is stirred for a further hour at 0° – 5°C and the product is filtered off and successively washed with 200 ml of a mixture of equal parts of dimethylformamide and methanol, with methanol and with water. After drying, 71.9 g of a mixture of 1-oxethylamino-6- and -7-nitroanthraquinone is obtained.

b. A dinotroanthraquinone mixture employed in (a) can be obtained as follows:

10 kg of anthraquinone are dissolved in 40 kg of 20% strength oleum, 20.6 kg of a mixed acid consisting of 33% of $HNO_3$ and 67% of $H_2SO_4$ are added over the course of 2 hours at below 50°C and the mixture is warmed to 90°C over the course of 2 hours and kept at this temperature until no further anthraquinone and mononitration product are detectable. The mixture is stirred until cold, the 1,5- and 1,8-dinitroanthraquinone which has separated out is filtered off and the filter residue is washed in portions with 37 kg of concentrated sulphuric acid. The filtrate liquors (approx. 91 kg) are filtered at 100°C, stirred until they have cooled to 70°C and treated with 7.8 liters of water over the course of approx. 1 hour, as a result of which the temperature rises to 80° – 85°C. After a further 30 minutes, the product is filtered off at 80°C and rinsed with 20 kg of 88% strength H₂SO₄. After washing until neutral, and drying, 3.3 kg of a product of the following composition are obtained:

| | |
|---|---|
| 1,6-dinitroanthraquinone | 41.8% |
| 1,7-dinitroanthraquinone | 38.6% |
| 1,8-dinitroanthraquinone | 12.0% |
| 1,5-dinitroanthraquine | 1.6% |
| 2,6- + 2,7-dinitroanthraquinone | <1.0% |
| hydroxy-dinitroanthraquinone | 1.2% |

EXAMPLE 5

55 ml of isopropylamine are added at an even speed over the course of 3 hours, under reflux, to 50 g of a technical mixture of 1,6- and 1,7-dinitroanthraquinone (77% pure, contaminated with 14% of 1,8-dinitroanthraquinone) in 100 ml of nitrobenzene at 95° – 100°C. After a further 30 minutes, 100 ml of methanol are added, the mixture is stirred for a further 45 minutes and the product is filtered off and successively washed with 50 ml of a mixture of equal parts of nitrobenzene and methanol, with methanol and with water. After drying, 42.2 g of a mixture of 1-isopropylamino-6- and -7-nitroanthraquinone are obtained.

EXAMPLE 6

15 g of 1,6-dinitroanthraquinone and 45 ml of β-phenylethylamine are stirred at 50° – 55°C (approx. 3 hours being required) until no further starting material is detectable. The mixture is diluted with 45 ml of ethylene glycol monomethyl ether whilst warm and the reaction product which separates out is filtered off at 50°C and rinsed with a little ethylene glycol monomethyl ether and water. 13.6 g of pure 1-β-phenylethylamino-6-nitroanthraquinone are obtained.

If 1,6- or 1,7-dinitroanthraquinone or their mixture is reacted with aliphatic, cycloaliphatic or araliphatic amines in accordance with one of the instructions given in Examples 1 – 6, the compounds of the formula

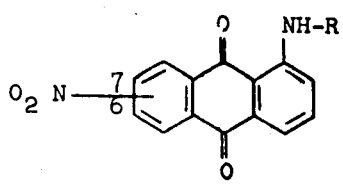

listed in the table are obtained, which dye polyester fibres, according to one of the instructions given in Examples 49 – 52, in ruby-violet shades. The Figures 6 or 7 in the second column indicate that a pure dyestuff of the corresponding substitution is concerned, whilst the Figure 6,7 shows that a corresponding dyestuff mixture is concerned.

Table

| No. | Position of the NO₂ group | R |
|---|---|---|
| 7 | 6,7 | CH(CH₃)₂ |
| 8 | 6,7 | CH(CH₂OH)(CH₂—CH₃) |
| 9 | 6,7 | —CH—(CH₂—CH₃)₂ |
| 10 | 6,7 | —CH(CH₃)(CH₂—CH₃) |
| 11 | 7 | —CH(CH₂—CH₂—C₆H₅)(CH₂—CH—(CH₃)₂) |
| 12 | 6,7 | —CH(CH₃)—CH₂—CH₂—C₆H₅ |
| 13 | 6 | —CH₂—CH₂—OCH₃ |
| 14 | 6,7 | —CH(CH₂—OCH₃)(CH₂—CH₃) |
| 15 | 6 | —CH₂—CH₂—CN |
| 16 | 7 | —CH₂—CH₂—NH₂ |
| 17 | 6,7 | —CH₂—CH₂—Cl |
| 18 | 6,7 | —C₆H₄—CH₃ |
| 19 | 6,7 | cyclohexyl-CH₃ |
| 20 | 6,7 | —C₆H₄—C(CH₃)₃ |
| 21 | 6,7 | —C₆H₄—C₆H₅ |
| 22 | 6 | cyclohexyl-NH—CO—CH₃ |
| 23 | 7 | —C₆H₄—NH₂ |
| 24 | 6 | diphenyl ether group |
| 25 | 6 | cyclohexyl-CH₃ |
| 26 | 7 | CH₂—CH₂—O—COCH₃ |
| 27 | 6,7 | cyclohexyl with 3 CH₃ groups |
| 28 | 6,7 | —C₆H₄—OH |
| 29 | 6,7 | —C₆H₄—OCH₃ |
| 30 | 6 | CH₂—C₆H₅, cyclohexyl with 3 CH₃ groups |
| 31 | 6,7 | —C₆H₄—C₆H₁₁ |

Table-continued

| No. | Position of the NO₂ group | R |
|---|---|---|
| 32 | 7 | 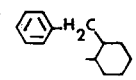 |
| 33 | 7 | $-CH_2-CH_2-O-CH_2-CH_2-CN$ |
| 34 | 6,7 | $-CH_2-CH_2-CH_2-CH_2-OCH_3$ |
| 35 | 6,7 | $-CH_2-CHOH-CH_2OH$ |
| 36 | 6 | |
| 37 | 7 | |
| 38 | 6,7 | $-CH_2-CH=CH_2$ |
| 39 | 6 | |
| 40 | 6 | |
| 41 | 6,7 | $-CH_2-CH_2-O-COCH_3$ |
| 42 | 6,7 | |
| 43 | 6 | $-CH_2-CH_2-CH_2-NH-COCH_3$ |
| 44 | 6,7 | |
| 45 | 6 | $-CH_2-CH_2-CO-CH_3$ |
| 46 | 7 | $-CH_2-CH_2OCO-CH_2-CN$ |
| 47 | 7 | $-(CH_2)_{11}-CH_3$ |
| 48 | 6 | $-CH_2-CH_2-NH-CO-CH_2OH$ |

EXAMPLE 49

A. 75 g of the dyestuff obtained according to Example 1, 50 g of an anionic dispersing agent, for example a ligninsulphonate or a condensation product of naphthalenesulphonic acid and formaldehyde, and 100 ml of water are mixed and converted into a finely divided form by grinding for 10 hours in a ball mill.

The dispersion thus obtained, which contains approx. 30% of raw dyestuff, is stable on storage.

B. The aqueous dispersion obtained according to (A) can be converted into a printing paste as follows: 50 – 200 g are worked into a paste with 400 g of a 10% strength carob bean flour-ether thickener and 550 – 400 ml of water.

C. A paper is gravure-printed with this printing paste. If this paper is pressed against a polyester fibre textile for 15–60 seconds at 200°C, a clear, strongly coloured, red print with good to very good fastness properties, but above all very good fastness to light, is obtained.

EXAMPLE 50

A. 100 g of a dyestuff dispersion prepared according to the instruction of Example 49A, but with the dyestuff obtained according to Example 2, are intimately mixed with 800 ml of water and 100 g of a 5% strength alginate thickener.

A cotton fabric web is impregnated with this dyestuff solution on a padder and is subsequently dried.

B. The cotton fabric obtained according to (A) is suitable for transfer printing, especially on bulky materials, such as, for example, carpets of polyester fibres or polyamide fibres, which it dyes in clear violet-red shades.

EXAMPLE 51

A. 40 – 50 g of the dyestuff obtained according to Example 4 are worked into a paste with 5 – 10 g of an emulsifier mixture of ethoxylated nonylphenol (4 – 12 mols of ethylene oxide) in water. 10 g of ethyl cellulose N4 (Hercules Powder) and 30 – 40 g of a maleate resin which has been produced by condensation of colophony with maleic acid are added. The mixture is kneaded for approx. 2 hours at 80° – 100°C and is subsequently ground on one of the customary mills. A finely granular dyestuff powder is obtained.

B. 200 g of the dyestuff powder obtained according to (A) are added, whilst stirring, to a mixture of 730 g of ethanol, 50 g of ethylene glycol and 20 g of ethyl cellulose N 22 (Hercules Powder).

C. Paper can be gravure-printed with the printing ink thus obtained. Cellulose acetate textiles, for example knitted fabrics, can be printed from these printed papers by the transfer process, and strong bluish-tinged red prints are obtained.

EXAMPLE 52 a. 10 g of polyethylene terephthalate hank material are dyed in a liquor of 400 ml of water, 0.4 g of the dyestuff obtained according to Example 5, in a finely divided form, 3.4 g of a mixture of o-, m- and p-cresotic acid methyl ester and 0.6 g of a mixture of equal parts of an anionic dispersing agent and a non-ionic polyglycol ether for 2 hours at 96° – 98°C after having added sulphuric acid until the pH value was 4.5; thereafter the material is rinsed and dried.

A red-violet dyeing of outstanding fastness to light is obtained.

b. 10 g of a polyethylene terephthalate rag are dyed in a liquor of pH 4.5 consisting of 400 ml of water and 0.4 g of the dyestuff of Example 2, present in a very finely divided form, and 0.3 g of a mixture of equal parts of aralkylsulphonate phonate and of a non-ionic polyglycol ether, for 2 hours at 120° – 130°C. After rinsing and drying, a red-violet dyeing of outstanding fastness to light is obtained.

c. A fabric of polyethylene glycol terephthalate fibres is impregnated on a padder with a liquor which contains, in 1,000 g, 20 g of finely divided 1-(γ-phenyl-α-methylpropylamino)-6(7)-nitroanthraquinone and 10 g of thermosol auxiliary, especially a polyether described in Belgian Patent No. 615,102.

The fabric is then squeezed out to a weight increase of 70% and is dried in a suspension jet drier or in a drying cabinet at 80°– 120°C. The fabric is then treated in a stenter frame or in a jet hot-flue for approx. 45 seconds with hot air at 190°– 200°C and is then rinsed, subjected to a reduction after-treatment if appropriate, and dried. The reduction after-treatment to remove dyestuff superficially adhering to the fibres can be carried out by introducing the fabric into a liquor at 25°C containing 3 – 5 cm³ of sodium hydroxide solution of 38° Be/liter and 1 – 2 g of (concentrated) hydrosulphite/liter, heating the liquor to 70°C over the course of approx. 15 minutes and leaving it at 70°C for a minutes. The fabric is then rinsed hot, acidified with 2 –3 cm³ of 85% strength formic acid/liter at 50°C, rinsed and dried. A clear bluish-tinged ruby-coloured dyeing is obtained, which is distinguished by its high dyestuff yield and by good fastness to light, thermofixing, rubbing and washing.

A very similar dyeing is obtained if instead of the polyethylene terephthalate fibres, polyester fibres of 1,4-bis-hydroxymethylcyclohexane and terephthalic acid are used.

d. A previously cleaned and thermoset polyethylene terephthalate fibre fabric is printed with a printing paste consisting of the following components: 40 g of 1-(γ-phenyl-α-methylpropylamino)-6(7)-nitroanthraquinone, 475 g of water, 465 g of crystal gum (1:2) and 20 g of sulphonated castor oil. Instead of crystal gum, an alginate thickener can also be used. The printed and dried goods are run through a high capacity stenter frame or condensation apparatus at 190° – 200°C to fix the dyestuff. The period of treatment is 30 – 60 seconds. The resulting fixed print is subsequently rinsed cold, soaped for approx. 10 minutes with 1 – 2 g of anionic detergent/liter at 70° – 80°C, rinsed first hot and then cold, and dried. A print analogous to the dyeing of Example 52(c) is obtained, which is distinguished by equally good fastness properties.

e. If a cellulose triacetate fabric is treated under a-c, slightly weaker, and somewhat bluer dyeings are obtined.

f. 0.2 g of the dyestuff according to Example 4 is worked into a paste with 0.2 g of a 10% strength solution of Marseilles soap and the mixture is made up to 300 g with water at 50°C, adding a further 6 g of Marseilles soap solution. 10 g of acetate rayon are introduced into this liquor, the temperature is raised to 75°C in 20 minutes and the rayon is dyed at the same temperature for one hour, then rinsed with lukewarm water and dried. A red-violet dyeing is obtained.

We claim:

1. Compound or mixtures of compounds having the formula

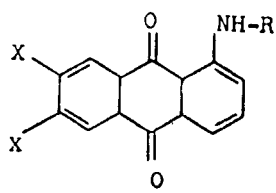

in which
one X is a nitro and the other X is hydrogen; and R is $C_1-C_{12}$-alkyl; phenyl-$C_1-C_8$-alkyl; phenyl-$C_1-C_{12}$-alkyl; phenyl-$C_1-C_{12}$-alkyl substituted in the phenyl ring by $C_1-C_4$-alkyl; cyclohexyl; or cyclohexyl substituted by benzyl, phenyl or cyclohexyl.

2. Compound or mixtures of compounds of claim 1 in which
$R_1$ and $R_2$ are $C_1-C_4$-alkyl.

3. Compounds of the formulae

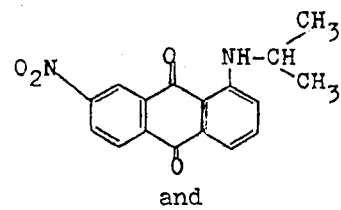

and

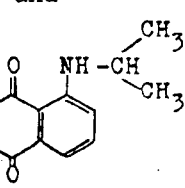

and their mixtures.

4. Compounds of the formulae

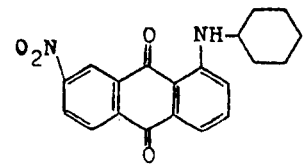

and

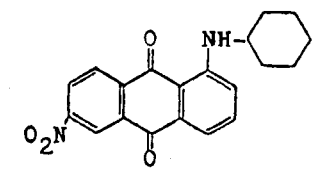

and their mixtures.

5. Compounds of the formulae

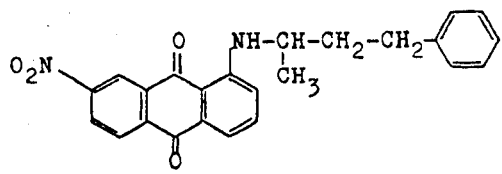

and

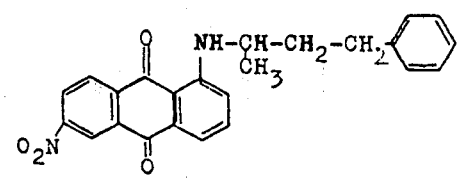

and their mixtures.

* * * * *